United States Patent
Chun et al.

(10) Patent No.: US 6,898,212 B1
(45) Date of Patent: May 24, 2005

(54) SYSTEMS AND METHODS FOR CONTROLLING AUDIBLE SPEECH DISTORTION IN A GPS-BASED CDMA WIRELESS NETWORK USING ATM TRANSPORT

(75) Inventors: Dexter Chun, San Diego, CA (US); Manoj Deshpande, San Diego, CA (US); Steve Hicks, San Diego, CA (US); Bob Knight, San Diego, CA (US); KC Lee, San Diego, CA (US); Ravi Palakodety, San Diego, CA (US); Ramesh Ramaswamy, San Diego, CA (US); Gustavo Serena, San Diego, CA (US); Dave Walker, Escondido, CA (US); Jun Zhang, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 991 days.

(21) Appl. No.: 09/713,778
(22) Filed: Nov. 14, 2000
(51) Int. Cl.$^7$ .................................................. H04J 3/06
(52) U.S. Cl. ...................................... 370/503; 370/547
(58) Field of Search .................. 368/184, 47; 370/202, 370/503, 507; 375/356; 709/208; 327/141, 144, 153

(56) References Cited

U.S. PATENT DOCUMENTS

| | | | | |
|---|---|---|---|---|
| 4,530,091 A | * | 7/1985 | Crockett ..................... | 370/229 |
| 5,305,308 A | * | 4/1994 | English et al. .............. | 370/335 |
| 5,722,074 A | * | 2/1998 | Muszynski ................... | 455/442 |
| 6,128,318 A | * | 10/2000 | Sato ........................... | 370/503 |
| 6,219,347 B1 | * | 4/2001 | Uchida et al. .............. | 370/347 |
| 6,243,372 B1 | * | 6/2001 | Petch et al. ................. | 370/350 |
| 6,480,483 B2 | * | 11/2002 | Yahata et al. ............... | 370/350 |
| 2003/0138061 A1 | * | 7/2003 | Li .............................. | 375/326 |

* cited by examiner

Primary Examiner—Wellington Chin
Assistant Examiner—Mark Mais
(74) Attorney, Agent, or Firm—Coats & Bennett, P.L.L.C.

(57) ABSTRACT

A Base Station Controller (BSC) that reduces the occurrence of audible noise in a Code Division Multiple Access (CDMA) radio network is provided. The BSC according to one embodiment of the present invention comprises a Media Stream Board (MSB) for compressing groups of 160 PCM speech samples from a Public Switch Telephone Network (PSTN) into vocoded frames, and a Special Purpose Board (SPB) for reformatting the vocoded frames from the MSB into over-the-air CDMA vocoded frames. The MSB and SPB each have a local timer that is slave to "PSTN time". The BSC further comprises a Timing Unit Board (TUB) connected to a GPS receiver. The TUB receives "GPS time" from the GPS receiver. The TUB generates timing cells, each containing time-of-day information according to "GPS time". The TUB distributes the timing cells to the MSB and the SPB over an Asynchronous Transfer Mode (ATM) network. The MSB and SPB use the received timing cells to compare their local timer, which tracks "PSTN time", to "GPS time". The MSB and the SPB realign their local timer with "GPS time" whenever their local timer drifts from "GPS time" outside of a predetermined time window.

22 Claims, 6 Drawing Sheets

SYSTEMS AND METHODS FOR CONTROLLING AUDIBLE SPEECH DISTORTION IN A GPS-BASED CDMA WIRELESS NETWORK USING ATM TRANSPORT

FIELD OF THE INVENTION

The present invention relates generally to Code Division Multiple Access (CDMA) wireless communication networks and, more particularly, to systems and methods for reducing the occurrence of audible noise in a CDMA wireless network.

BACKGROUND OF THE INVENTION

A CDMA wireless network provides a communication link between callers on the Public Switch Telephone Network (PSTN) and callers on mobile stations (MSs). The PSTN supports Pulse Code Modulated (PCM) speech signals, which are digital speech signals sampled at a frequency of 8 KHz. The CDMA network comprises a Base Station Controller (BSC) for compressing groups of 160 PCM speech samples from the PSTN into 20 ms vocoded frames, and a Radio Base Station (RBS) for modulating the vocoded frames into spread-spectrum signals and broadcasting the spread-spectrum signals to the MSs.

The RBS broadcasts the spread-spectrum modulated frames to the MSs at specific frames offset times, which are typically spaced 1.25 ms apart and are disciplined to Global Positioning system (GPS) time. A problem arises in that the PSTN operates asynchronously to GPS time. This problem usually manifests itself as audible shot noise (soft pop or click) which occurs when a PCM speech sample is corrupted, dropped or repeated as a result of time drift between "PSTN time" and "GPS time". The severity of the audible noise depends on how frequently it occurs and how much discontinuity it introduces.

In first and second generation CDMA radio networks, the BCS repeats or drops a PCM speech sample whenever "PSTN time" drifts from "GPS time" by 125 microseconds, which equals the time period of one PCM speech sample. A drawback of this approach is that it frequently introduces audible noise into the speech signal whenever "PSTN time" and "GPS time" drift by 125 microsecond. In addition, this approach requires providing a highly accurate GPS timing source to processor boards in the BSC, which perform the dropping and repeating of PCM speech samples.

Therefore, there is a need for a BSC that only drops or repeats PCM speech samples when the drift between "PSTN time" and "GPS time" exceeds a threshold much greater than 125 microseconds. This would greatly reduce the occurrence of audible noise caused by the drift between "PSTN time" and "GPS time". There is also a need for a BSC that relaxes the accuracy requirement of the GPS timing source provided to its processor boards. This would allow the use of commercially available low-cost hardware to distribute the GPS timing source to the BSC's processor boards.

SUMMARY OF THE INVENTION

The present invention addresses the above problems of the prior art by providing a BSC that reduces the occurrence of audible noise and relaxes the accuracy requirement of the GPS timing source provided to its processor boards.

In one embodiment, a BSC comprises a Media Stream Board (MSB) for compressing groups of 160 PCM speech samples from the PSTN into 20 ms vocoded frames, and a Special Purpose Board (SPB) for reformatting the vocoded frames from the MSB into over-the-air CDMA vocoded frames. The MSB and SPB each have a local timer that is slave to "PSTN time". The BSC further comprises a Timing Unit Board (TUB), which receives "GPS time" from the GPS receiver.

The TUB generates timing cells, each cell containing time-of-day information closely synchronized with "GPS time". The TUB distributes the timing cells to the MSB and the SPB over an Asynchronous Transfer Mode (ATM) network. The MSB and SPB use the received timing cells to compare their local timer, which tracks "PSTN time", to "GPS time". The MSB and the SPB realign their local timer with "GPS time" whenever their local timer drifts from "GPS time" outside of a 2 ms time window. This ensures that the RBS is able to broadcast the spread-spectrum modulated frames to the MSs at the correct frame offset times.

Preferably, the MSB realigns its local timer with. "GPS time" by dropping or repeating PCM speech samples. Nominally, the MSB's local timer is set in the center of the 2 ms time window so that a 1 ms drift in either direction can be tolerated. As a result, the MSB drops or repeats PCM speech whenever its local timer drifts from "GPS time" by approximately 1 ms, which is much greater than 125 microseconds. Therefore, the MSB can reduce the occurrence of audible noise caused by the drift between "PSTN time" and "GPS time by almost an order of magnitude over the prior art. In addition, a 2 ms time window relaxes the accuracy requirement for the GPS timing source provided to the MSB and the SPB. This allows the timing cells to be distributed to the MSB and the SPB using existing low-cost ATM or Ethernet networks, thereby reducing the hardware cost of the BSC.

Other objects and features of the present invention will become apparent from consideration of the following description taken in conjunction with the accompanying drawings.

BRIEF DESCRIPTION OF THE DRAWINGS

The drawings illustrate both the design and utility of the preferred embodiments of the present invention, in which similar elements in different embodiments are referred to by the same reference numbers for purposes of ease in illustration of the invention, wherein.

DETAILED DESCRIPTION OF THE PREFERRED EMBODIMENTS

Figure 1:
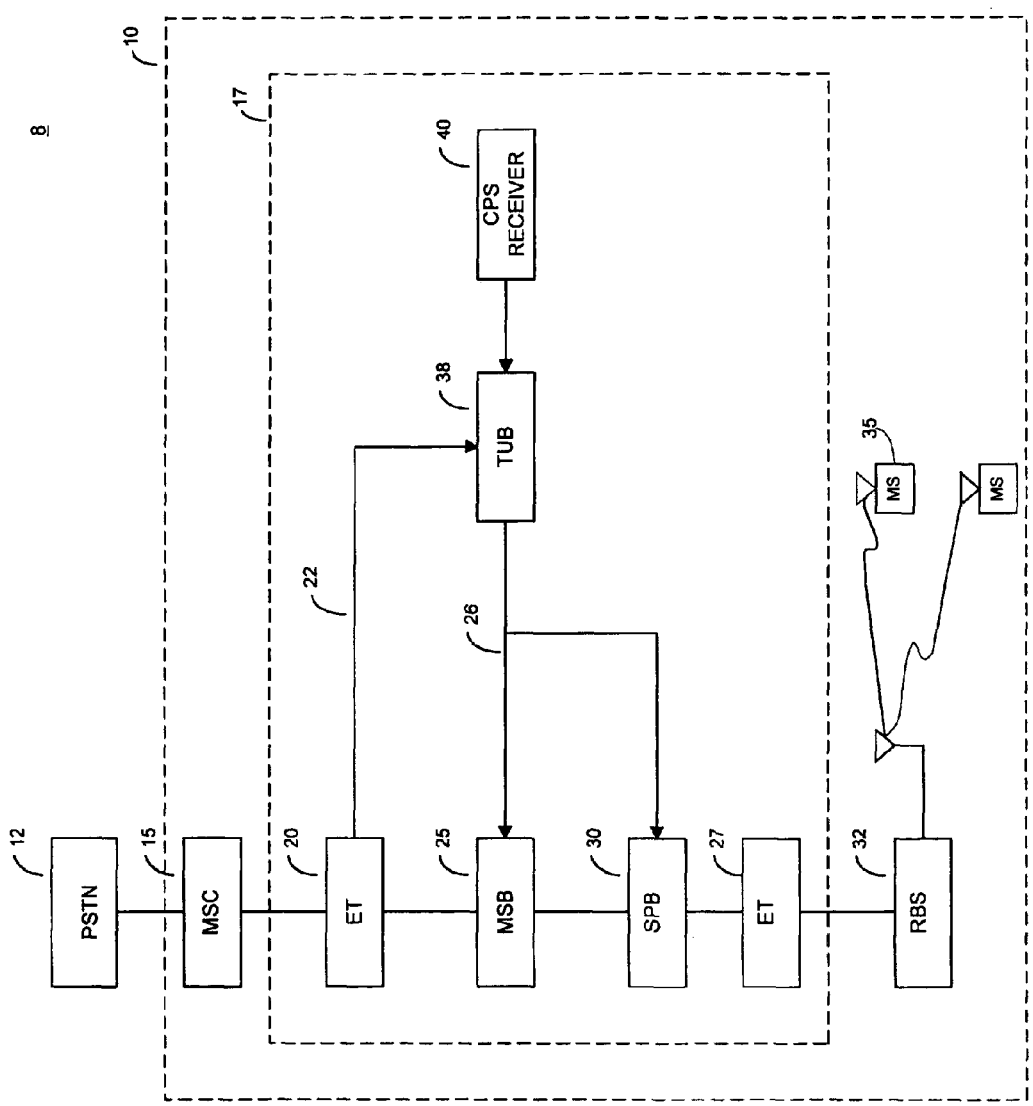
FIG. 1 is block diagram of an exemplary CDMA wireless communication network.

FIG. 1 shows an overview of an exemplary communications network 8. The network 8 comprises a PSTN 12 connected to a CDMA wireless network 10. The PSTN 12 supports PCM speech signals, which are 64 kps digital speech signals sampled at a frequency of 8 KHz. The CDMA network 10 comprises a MSC 15, a BSC 17, a RBS 32, and a plurality of MSs 35. The MSC 15 routes the PCM speech signals from the PSTN 12 to the BSC 17. The BSC 17 compresses the speech signals into vocoded frames of compressed speech data. The RBS 32 then modulates the vocoded frames into spread-spectrum signals and broadcasts the spread-spectrum signals to the mobile stations (MSs) 35.

The BSC 17 comprises a first Exchange Terminal (ET) 20, a Media Stream Board (MSB) connected to the first ET 20, a Special Purpose Board (SPB) 30 connected to the MSB 25, and a second ET 27 connected to the SPB 30. For simplicity, the BSC 17 is shown only having one MSB 25 and one SPB 30, though a typical BSC 17 can support hundreds of MSBs and SPBs. The first ET 20 provides an interface between the MSC 15 and the BSC 17. The MSB 25 compresses groups of 160 PCM speech samples from the PSTN 5 into 20 ms vocoded frames of compressed speech data. The SPB 30 reformats the 20 ms vocoded frames from the MSB 25 into over-the-air CDMA vocoded frames. The SPB 30 also performs radio management functions for each speech channel of the BSC 17. The second ET 27 provides an interface between the BSC 17 and the RBS 32.

The BSC 17 further comprises a Timing Unit Board (TUB) 38 for providing time-of-day information to the MSB 25 and the SPB 30. The TUB 38 is connected to the first ET 20 and a GPS receiver 40. The TUB 38 receives a 8 KHz frequency reference clock signal 22 from the first ET 20. The 8 KHz reference clock signal 22 is derived from the 8 KHz sampling frequency of the PCM speech signals from the PSTN 5, and therefore tracks "PSTN time". The TUB 38 also receives Universal Coordinated Time (UTC) from the GPS receiver 40 at a frequency of 1 HZ or once per second. The UTC provides the TUB 38 with absolute time-of-day information based on "GPS time". The TUB 38 has a local timer that uses the UTC to track "GPS time" at a rate of once per second. The local timer also uses the 8 KHz reference clock to track time between transmissions of the UTC from the GPS receiver 40. Because the TUB 38 receives the UTC every second, its local timer is frequently updated with "GPS time", and therefore provides a very accurate indication of "GPS time".

The TUB 38 generates timing cells, each containing time-of-day information based on its local timer. The TUB 38 then transmits the timing cells to the MSB 25 and the SPB 30 at regular intervals to provide the MSB 25 and the SPB 30 with an accurate indication of "GPS time". Preferably, the timing cells are transmitted to the MSB 25 and the SPB 30 over an Asynchronous Transfer Mode (ATM) network 26 in which the timing cells are transmitted in ATM packets using switched virtual circuits (SVCs). Alternatively, the timing cells can be transmitted to the MSB 25 and the SPB 30 over an Ethernet network or a Universal Serial Bus (USB).

The significance of providing "GPS time" to the MSB and the SPB is that the RBS 32 and the MSs 35 are synchronized with "GPS time". This is done to provide very accurate timing between the RBS 32 and the MSs 35. The RBS 32 needs be able to transmit a pseudorandom noise (PN) pilot sequence to the MSs 35 with sub-micron accuracy. This is because the MSs 35 uses the time offset of the PN pilot sequence to distinguish the RBS 32 from other RBSs who transmit their PN pilot sequences at different time offsets. The time offsets of the PN pilot sequences differ from each other in increments of PN chips or approximately 807 nanoseconds. Therefore, the RBS 32 and the MSs 35 have to be closely aligned in time for the MSs 35 to properly locate the RBS's 32 PN pilot sequence.

Fortunately, the timing requirement between the BSC 17 and the RBS 32 is more relaxed. This is because the SPB 30 transmits speech data to the RBS 32 in units of 20 ms frames. Typically, a time drift of a few milliseconds between the BSC 17 and the RBS 32 can tolerated for the RBS to broadcast the spread-spectrum modulated frames to the MSs 35 at the correct frame offset times.

Figure 2:
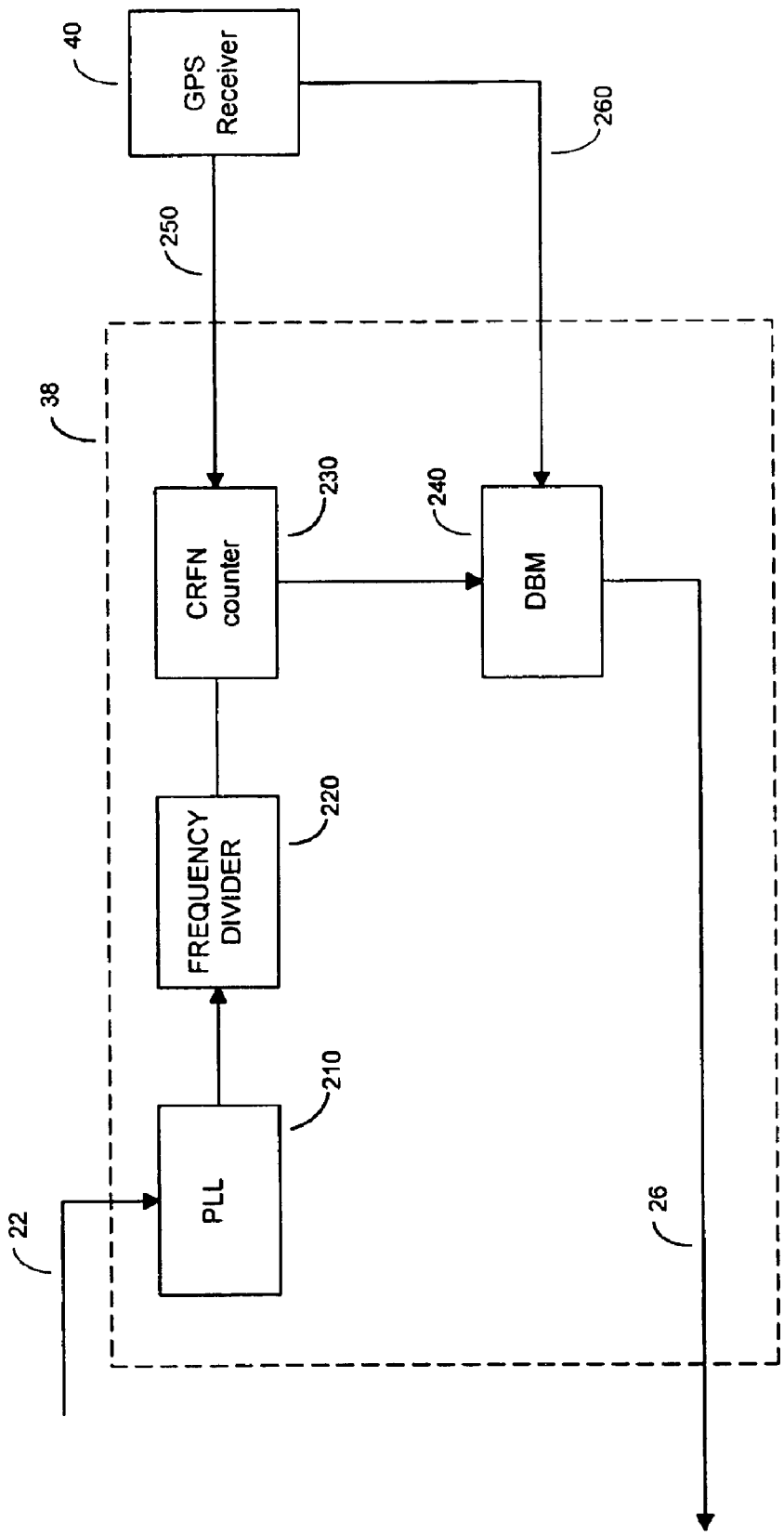
FIG. 2 is a block diagram of a Timing Unit Board (TUB) employed in a BSC of the network of FIG. 1.

FIG. 2 shows the TUB 38 in greater detail. The TUB 38 comprises a phase lock loop (PLL) 210, a frequency divider 220, and a CDMA Reference Frequency Counter (CRFN) counter 230. The PPL 210 receives the 8 KHz frequency reference clock signal 22 from the first ET 20. The PPL 220 multiples the frequency of the reference clock signal 22 to 19.44 MHz. The frequency divider 230 then divides the frequency to 2.048 MHz, which is then inputted to the CRFN counter 230. The CRFN counter 230 also receives a GPS event signal 250 from the GPS receiver 40 at a frequency of 1 HZ or once per second.

The CRFN counter 230 is preferably a 16-bit counter that free-runs off the 2.048 MHz signal from the frequency divider 220. The CRFN counter 230 has a resolution of about 62.5 microseconds and decrements by 1 every 62.5 microseconds. The CRFN counter 230 is also programmable in modulus for controlling the counter roll over. For example, a modulus of 1/16000 causes the CRFN counter 230 to roll over every 1 second. At each GPS event signal 250, the CRFN counter's 230 programmable modulus is reloaded, which realigns the CRFN counter 230 with "GPS time". Therefore, even though the CRFN counter 230 free-runs off the 2.048 MHz signal derived from the 8 KHz sampling frequency of the PSTN 5, the CRFN counter 230 is realigned with "GPS time" every second by the GPS event signal 250. Thus, the CRFN counter 230 provides a very accurate indication of "GPS time".

The TUB 38 also comprises a Device Board Module (DBM) 240. The DBM 240 receives the Universal Coordinated Time (UTC) 260 from the GPS receiver 40 at a frequency of 1 Hz via an asynchronous data channel. The DBM 240 also receives a count value and an interrupt signal from the CRFN counter 230. The CRFN counter 230 transmits the interrupt signal to the DBM 240 every time it rolls over. The DBM 240 has a local digital timer that uses the UTC 260 from the GPS receiver 40 and the count value from the CRFN counter 230 to track time. The local digital timer stores the UTC 260 in a register for its higher bits, and uses the count value from the CRFN counter 230 for its lower bits.

The DBM 240 also generates and schedules timing cells for transmission to the MSB 25 and the SPB 30. Each timing cell includes time-of-day information based on the DBM's 240 local timer, which provides an accurate indication of "GPS time". Each timing cell also includes an ID field identifying the cell as a timing cell. The DBM 240 uses the interrupt signal from the CRFN counter 230 to trigger the transmission of the timing cells. Prior to triggering, the DBM 240 generates a timing cell for each destination board in the BSC 17. Also, prior to triggering, the DBM 240 sets ups the SVCs in the ATM network 26 for transporting the timing cells to the destination boards in the BSC 17.

Preferably, the DBM 240 transmits one timing cell to one destination board in the BSC 17 at a time. This is done because transmitting timing cells to too many boards at once will create a large time delay between the first and last timing cell. Instead, the DBM 240 transmits the timing cells in a round-robin fashion, in which one timing cell is transmitted to one of the destination boards in the BSC 17 at each RFN counter 230 interrupt.

For example, suppose a BSC 17 has a total of 100 MSBs and SPBs, each requiring GPS time-of-day information every 10 second. For each MSB 25 and SPB 30 to receive a timing cell every 10 seconds, the DBM 240 has to transmit a timing cell to one of the boards every 100 ms. This requires that the CRFN counter 230 transmit an interrupt signal to the DBM 240 every 100 ms to trigger the transmission of a timing cell.

Figure 3:
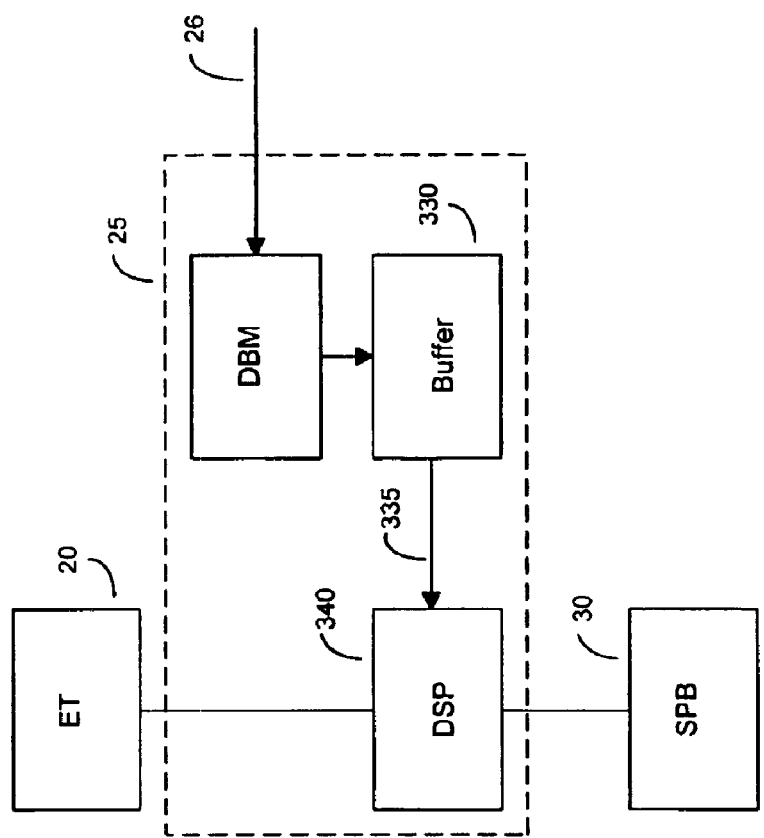
FIG. 3 is a block diagram of a Media Stream Board (MSB) employed in a BSC of the network of FIG. 1.

FIG. 3 shows the MSB 25 in greater detail. The MSB 25 comprises a Digital Signal Processor (DSP) 340. The DSP 340 compresses groups of 160 PCM speech samples originating from the PSTN 5 into 20 ms vocoded frames of compressed data in the forward direction. The DSP 340 also decompresses 20 ms vocoded frames originating from the MSs 35 to produce PCM speech samples in the reverse direction. The MSB 25 further comprises a DBM 320 that receives the timing cells from the TUB 38 over the ATM network 26. The DBM 320 stores the received timing cells in a memory buffer 330, which is accessible by the DSP 340 via a 32-bit X-bus.

The DSP 340 has a local timer that is slave to "PSTN time". The local timer may be realized using an RFN counter that free-runs off a signal derived from the 8 KHZ sampling frequency of the PSTN 5. The DSP 340 uses its local timer to time the compression of PCM speech samples into the 20 ms vocoded frames. The DSP 340 also accesses the GPS time-of-day information from the buffer 330 each time the DBM 320 receives a timing cell from the TUB 38. This allows the DSP 340 to compare its local timer with "GPS time", and therefore measure the drift between "PSTN time" and "GPS time".

Because the "PSTN time" and the "GPS time" are derived differently, they drift from each other over time. As a result, the DSP's 340 local timer, which tracks "PSTN time", slowly drifts from the RBS 32, which is synchronized with "GPS time". Fortunately, the SPB 30 sends and receives traffic from the RBS 32 in units of 20 ms vocoded frames. This allows the DSP 340 to send the vocoded frames to the SPB 30, which then sends the frames to the RBS 32, with up a few milliseconds of drift with respect to "GPS time".

Typically, the DSP 340 needs to send the vocoded frames to the SPB 30 within a 2 ms time window to ensure that the RBS 32 is able to braodcast the spread-spectrum modulated frames to the MSs 35 at the correct fame offset times. Nominally, the MSB 25 is set to send the 20 ms vocoded frames in the center of the 2 ms time window so that a 1 ms drift in either direction can be tolerated. When the MSB 25 operates outside the 2 ms window, the vocoded frames risk being transmitted to the RBS 32 at the wrong time. To avoid this, the MSB 25 is resynchronized with "GPS time" using the timing cells, when the DSP 340 detects a drift outside the allowed 2 ms time window. This is done by reloading the DSP's 340 local timer whenever the DSP 340 detects a 1 ms drift between its local timer and a received timing cell.

In order to realign itself with "GPS time", the DSP 340 drops or repeats a portion of the PCM speech samples, depending on whether its local timer is ahead or behind "GPS time". To better understand this particular operation of the DSP 340, a detailed description of the DSP 340 during normal operation is given with reference to FIG. 4.

Figure 4:
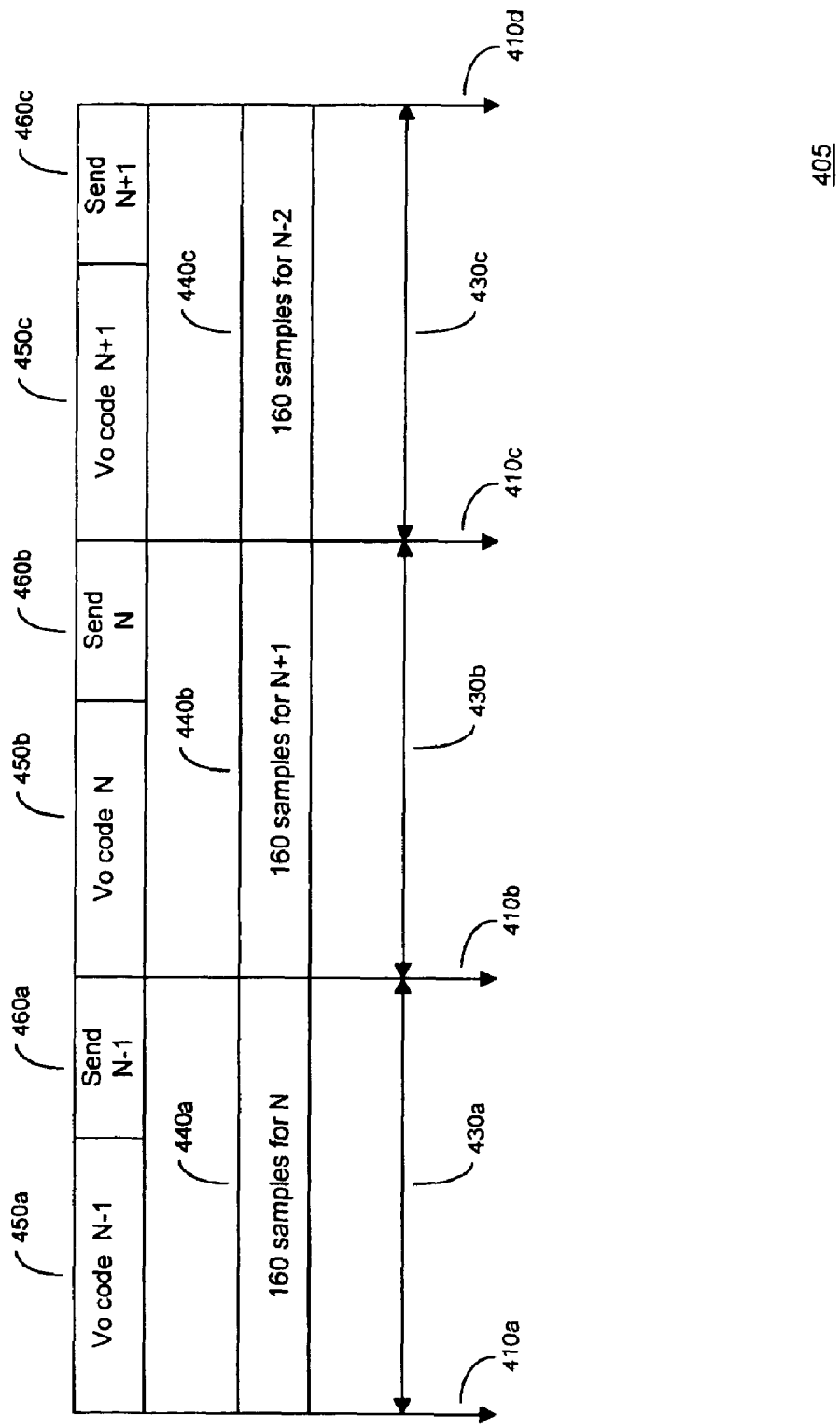
FIG. 4 is a time line showing the compression of PCM speech samples into 20 ms vocoded frames in the MSB of FIG. 3.

FIG. 4 shows a time line 405 for compressing the PCM speech samples into 20 vocoded frames in the DSP 340. The time line 405 is broken into 20 ms timeslots 430a–c. The down arrows 410a–d indicate time ticks from the DSP's 340 local timer that define the timeslots 430a–c. In the timeslots 430a–c, frames N–1 450a, N 450b and N+1 450c are vocoded by the DSP 340, respectively. Each 20 ms vocoded frame compresses 160 speech samples 440a–c collected in the previous timeslot 430a–c. For example, in timeslot 430b, frame N 450b is vocoded from 160 speech samples 440a collected in timeslot 430a. The vocoding time for each frame does not require the full 20 ms of the timeslots 430a–c, and can be "burst" processed. There is an idle time 460a–c between the end of each vocoded frame 450a–c and the next timeslot 430a–c. The idle time 460a–c is inversely proportional to the number of vocoders in the DSP 340. During each idle time 460a–c, the current vocoded frame is sent to the SPB 30, and from there to the RBS 32.

Figure 5:
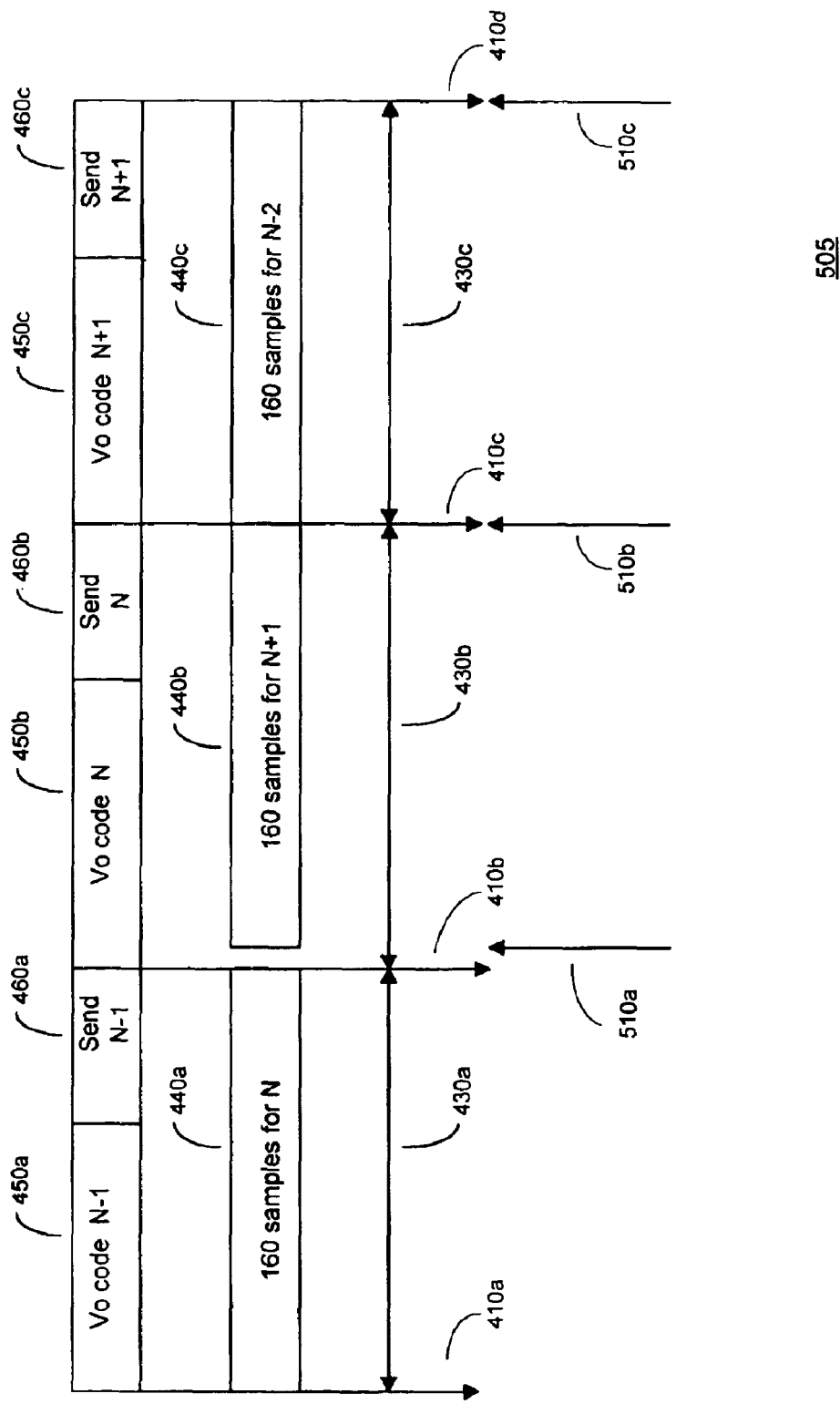
FIG. 5 shows the time line of FIG. 4, in which the local timer of a Digital Signal Processor (DSP) employed in the MSB is ahead of GPS time.

FIG. 5 shows a time line 505 similar to FIG. 4 in which the DSP's local timer is ahead of "GPS time". FIG. 5 shows up arrows 510a–c indicating where the DSP's time ticks should be located based on "GPS time" received from a timing cell. The difference between the leftmost down arrow 510a and the up arrow 410b indicates the drift between "PSTN time" and "GPS time". In FIG. 5, the drift is about 1 ms, which is just outside the 2 ms window. This means that the RBS 32 risks receiving the 20 ms vocoded frames too early. Thus, the DSP's 340 time tick has to be corrected to line up with "GPS time". In this case, the DSP 340 realigns itself with GPS time" by extending the timeslot 430b for vocoding frame N 450b from 20 ms to 21 ms. Frame N 450b is successfully vocoded and sent to the SPB 30 because of the extra 1 ms of time in timeslot 430b.

However, in the forward direction, the 160 speech samples 440b collected for frame N+1 450c only span 20 ms whereas timeslot 430b spans 21 ms. The DSP 340 corrects for this by dropping 1 ms worth of speech samples at the beginning of timeslot 430b.

In the reverse direction, the DSP 340 only produces 20 ms worth of PCM speech samples by decompressing a vocoded frame from one of the MSs 35. Because timeslot 430b spans 21 ms, a 1 ms void is created. The DSP 340 corrects for this by repeating 1 ms of speech samples in timeslot 430b.

Figure 6:
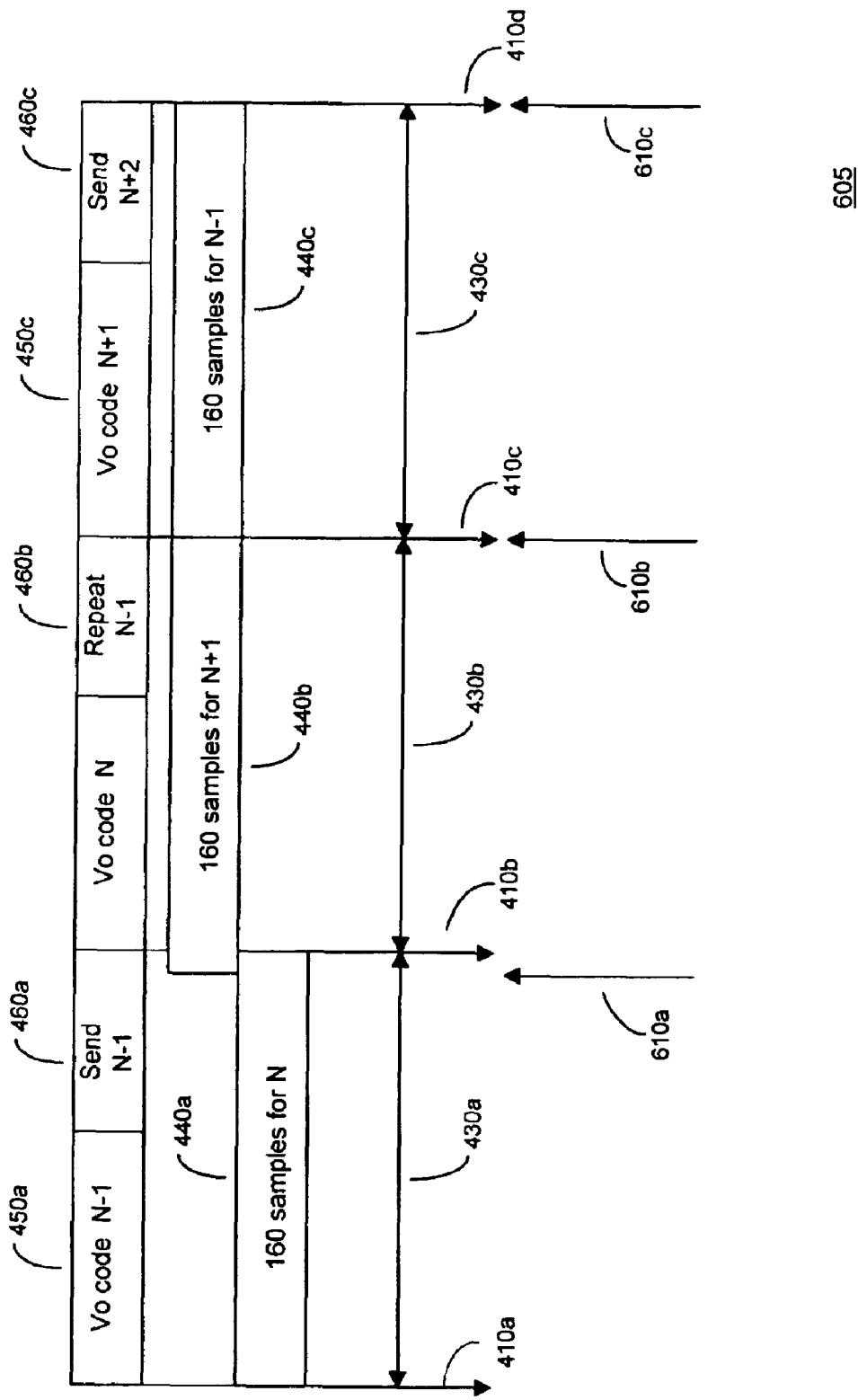
FIG. 6 shows the time line of FIG. 4, in which the local timer of the DSP is behind GPS time.

FIG. 6 shows the time line in which the DSP's 340 local timer is behind "GPS time" by about 1 ms. FIG. 6 shows up arrows 610a–c indicating where the DSP's 340 time ticks should located based on "GPS time" received from a timing cell. The difference between the leftmost up arrow 610a and down arrow 410b indicates the time drift between "PSTN time" and "GPS time". In this case, the DSP 340 realigns itself with "GPS time" by shortening timeslot 430b from 20 ms to 19 ms. Because timeslot 430b is shortened by 1 ms, there is no guarantee that frame N 450b is successfully vocoded in the forward direction. As a result, the DSP 340 drops frame N 450b and repeats vocoded frame N–1 450a. Furthermore, the 160 speech samples 440b collected for frame N+1 450c span the 19 ms of timeslot 430b and 1 ms of timeslot 430a. Thus, the speech samples 440b collected for frame N+1 450c overlap the speech samples 440a collected for dropped frame N 450b by 1 ms. As a result, 19 ms worth of speech samples are dropped by dropping frame N 450b instead of 20 ms.

In the reverse direction, the DSP 340 produces 20 ms worth of speech samples by decompressing a vocoded frame from one of the MSs 35. However, time slot 430b only spans 19 ms. The DSP 340 corrects for this by dropping 1 ms worth of speech samples in timeslot 430b.

Similar to the DSP 340 of the MSB 25, the SPB 25 has a local timer that is slave to "PSTN time". The SPB's 25 local timer may also be realized using an RFN counter that free-runs off a signal derived from the 8 KHz sampling frequency of the PSTN 5. The SPB 25 realigns its local timer with "GPS time" received from the timing cells when it detects a drift outside of the 2 ms window. This ensures that the over-the-air CDMA vocoded frames are sent in time to the RBS 32 for the RBS 32 to broadcast the spread-spectrum modulated frames to the MSs 35 at the correct frame offset times.

In a typical phone network, the drift between "PSTN time" and "GPS time" is about 1 ms every 11 hours. Therefore, the MSB 25 and the SPB 30 only have to be realigned with "GPS time" about once every 11 hours. As a result, the audio noise caused by dropping or repeating speech samples to realign the MSB 25 with "GPS time" occurs very infrequently. In fact, most phone calls on the network will not experience this audio distortion. This can be appreciated by referring to the following table.

| GPS | PSTN | Combined Error | Elapsed Time For 1 ms Drift |
| --- | --- | --- | --- |
| SA | stratum 3 | (1e-8) + (4.6e-6) | 3.8 minutes |
| Normal | stratum 3 | (1e-10) + (4.6e-6) | 3.8 minutes |
| SA | stratum 2 | (1e-8) + (1.6e-8) | 11 hours |
| Normal | stratum 2 | (1e-10) + (1.6e-8) | 18 hours |
| SA | stratum 1 | (1e-8) + (1e-11) | 27.8 hours |
| Normal | stratum 1 | (1e-10) + (1e-11) | 2500 hours |

The above table shows the time drift for various PSNT standards. The third column shows the combined timing error for GPS and various PSTN standards and the fourth column shows the elapsed time for 1 ms drift between GPS and various PSTN standards. The GPS timing error is about 1e–8 during selective availability (SA) and about 1e–10 during normal operation. The different PSTN standards offer varying levels of accuracy. Stratum 1 has the highest level of accuracy with a timing error of about 1e–11. This requires a Cesium, a GPS or a Loran-C disciplined oscillator. Stratum 2 has a timing error of about 1.6e–8, which requires a Rubidium or double oven oscillator. Stratum 3 has the lowest level of accuracy with a timing error of about 4.6e–6, which can be met with an oven controlled quarts oscillator.

As shown in the above table, for stratum 1 and 2, the elapsed time for a 1 ms drift between "PSTN time" and "GPS time" is 11 hours or above. Therefore, for stratum 1 and 2, the audio distortion caused by dropping or repeating speech samples to realign the MSB 25 with "GPS times" occurs very infrequently.

Another advantage of the present invention is that the size of the 2 ms window relaxes the need for high-precision time distribution of the timing cells. This allows the timing cells to be transported to the MSB 25 and the SPB 30 over existing ATM networks, Ethernet networks or USBs, thereby reducing hardware cost.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

What is claimed is:

1. A base station controller for a wireless network, comprising:
   a plurality of processor boards, each processor board comprising a local timer; and
   a timing unit for generating timing cells, each timing cell containing time information, the timing unit transmitting timing cells to the respective processor boards,
   wherein a processor board realigns its local timer with time information contained in a received timing cell whenever its local timer drifts from the time information contained in the timing cell outside of a predetermined time window.

2. The base station controller of claim 1, wherein the predetermined time window is approximately 2 ms.

3. The base station controller of claim 1, wherein the timing cells are transmitted to the processor boards over an Asynchronous Transfer Mode (ATM) network.

4. The base station controller of claim 1, wherein the timing cells are transmitted to the processor boards over an Ethernet network.

5. The base station controller of claim 1, wherein the timing cells are transmitted to the processor boards over a universal serial bus.

6. The base station controller of claim 1, wherein the time information contained in the respective timing cells is generated based on both a universal coordinated time received from a GPS receiver, and a reference clock received from a PSTN.

7. The base station controller of claim 6, wherein the reference clock has a frequency of 8 KHz.

8. The base station controller of claim 6, wherein the timing unit comprises
   means for multiplying the frequency of the reference clock;
   a counter receiving the frequency multiplied reference clock and a GPS event signal from the GPS receiver, wherein the counter free-runs off the frequency multiplied reference clock, reloads when it receives the GPS event signal, outputs a count value, and outputs an interrupt signal when it rolls over; and
   a device board module receiving the count value and the interrupt signal from the counter and receiving the universal coordinated time from the GPS receiver, wherein the device board module keeps track of time based on the received universal coordinated time and the received count value, and the device board module generates and transmits at least one timing cell when it receives the interrupt signal from the counter.

9. The base station controller of claim 8, wherein the counter receives the GPS event signal from the GPS receiver at a frequency of 1 Hz.

10. The base station controller of claim 1, wherein at least one of the processor boards is a media stream board for receiving speech samples from pulse code modulated speech signals and for compressing the received speech samples into frames of compressed speech data.

11. The base station controller of claim 10, wherein the media stream board drops or repeats a portion of the received speech samples when the media stream board realigns its local timer with the time contained in a received timing cell.

12. The base station controller of claim 11, wherein the predetermined time window of the media stream board is approximately 2 ms.

13. The base station controller of claim 10, wherein the media stream board compresses groups of 160 of the received speech samples into 20 ms vocoded frames of compressed speech data.

14. The base station controller of claim 13, wherein the media stream board drops about 1 ms worth of the received speech samples when the media stream board realigns its local timer with the time contained in a received timing cell.

15. The base station controller of claim 13, wherein the media stream board repeats a vocoded frame when the media stream board realigns its local timer with the time contained in a received timing cell.

16. In a wireless network, a base station controller comprising a plurality of processor boards, each processor board having a local timer, a method for reducing the occurrence of audible noise in the base station controller, comprising:

generating a plurality of timing cells, each timing cell containing time information;

transmitting the timing cells to the processor boards; and realigning the local timer a processor board with time information contained in a received timing cell when its local timer drifts from the received time information outside of a predetermined time window.

17. The method of claim 16, wherein the predetermined time window is approximately 2 ms.

18. The method of claim 16, further comprising transmitting the timing cells to the processor boards over an Asynchronous Transfer Mode (ATM) network.

19. The method of claim 16, further comprising transmitting the timing cells to the processor boards over an Ethernet network.

20. The method of claim 16, further comprising transmitting the timing cells to the processor boards over a Universal Serial Bus.

21. The method of claim 16, wherein generating the timing cells comprises receiving a universal coordinated time from a GPS receiver;

receiving a references clock from a PSTN; and basing the time information contained in the timing cells on the received universal coordinated time and the received reference clock.

22. The method of claim 21, wherein the reference clock has a frequency of 8 KHz.

* * * * *

UNITED STATES PATENT AND TRADEMARK OFFICE
CERTIFICATE OF CORRECTION

PATENT NO. : 6,898,212 B1  Page 1 of 1
APPLICATION NO. : 09/713778
DATED : May 24, 2005
INVENTOR(S) : Chun et al.

It is certified that error appears in the above-identified patent and that said Letters Patent is hereby corrected as shown below:

In Column 1, Line 45, delete "microsecond" and insert -- microseconds --, therefor.

In Column 3, Line 11, after "(MSB)" insert -- 25 --.

In Column 6, Line 27, delete "GPS time"" and insert -- "GPS time" --, therefor.

In Column 8, Line 33, in Claim 8, after "comprises" insert -- : --.

In Column 9, Line 18, in Claim 16, after "timer" insert -- in --.

In Column 10, Line 12, in Claim 21, after "comprises" insert -- : --.

Signed and Sealed this

Fifteenth Day of April, 2008

JON W. DUDAS
*Director of the United States Patent and Trademark Office*